United States Patent [19]

Raikov et al.

[11] 4,319,608

[45] Mar. 16, 1982

[54] LIQUID FLOW SPLITTER

[76] Inventors: Ivan Y. Raikov, ulitsa B. Galushkina, 26, kv. 34; Pavel A. Ivaschenko, ulitsa Glebovskaya, 4, kv. 51; Igor V. Samoilovsky, ulitsa B. Spasskaya, 1/2, korpus 2, kv. 9, all of Moscow, U.S.S.R.

[21] Appl. No.: 40,221

[22] Filed: May 18, 1979

Related U.S. Application Data

[63] Continuation of Ser. No. 792,557, May 2, 1977, abandoned, which is a continuation-in-part of Ser. No. 745,423, Nov. 26, 1976, abandoned, which is a continuation of Ser. No. 393,138, Aug. 30, 1973, abandoned.

[51] Int. Cl.³ .................... F16K 21/02; F15D 1/14
[52] U.S. Cl. ................ 137/625.48; 137/872; 138/42; 138/46; 251/126
[58] Field of Search ............. 137/561 R, 561 A, 861, 137/625.48, 872; 251/324, 126; 138/42, 46

[56] References Cited

U.S. PATENT DOCUMENTS

| | | | |
|---|---|---|---|
| 2,323,115 | 6/1943 | Bryant | 138/43 |
| 2,447,920 | 8/1948 | Terry | 137/625.48 |
| 2,467,722 | 4/1949 | Baker | 137/561 R |
| 2,840,096 | 6/1958 | Du Bois | 138/43 X |
| 3,018,041 | 1/1962 | Bidwell | 251/126 X |
| 3,476,153 | 11/1969 | Roland | 251/126 X |
| 3,515,161 | 6/1970 | Kent | 137/832 |
| 3,797,528 | 3/1974 | Beckert | 138/46 |
| 4,069,843 | 1/1978 | Chatterjea | 251/126 |

*Primary Examiner*—Arnold Rosenthal
*Attorney, Agent, or Firm*—McAulay, Fields, Fisher, Goldstein & Nissen

[57] ABSTRACT

A cylindrical chamber accommodates an axially movable rod having a helically grooved portion of the periphery, to which a starting flow of liquid is fed via an inlet passage of said cylindrical chamber, outlet passages for discharging separate streams of liquid after splitting of the initial flow to users and for feeding one of the streams back to the initial flow being arranged on different sides of the inlet passage. The distances between the geometrical axes of the inlet passage and outlet passages for discharging liquid to users are substantially identical and equal to the length of the helically grooved portion of the rod. With such a construction of the splitter, liquid supply to users may be varied over a broad range with relatively small axial displacement of the rod.

1 Claim, 5 Drawing Figures

LIQUID FLOW SPLITTER

This application is a continuation of application Ser. No. 792,557, filed May 2, 1977, now abandoned, which is a continuation-in-part of Ser. No. 745,423, filed Nov. 26, 1976, now abandoned, which in turn is a continuation of Ser. No. 393,138, filed Aug. 30, 1973, and now abandoned.

BACKGROUND OF THE INVENTION

This invention relates to hydraulic splitter means, and more specifically to splitters of initial flow of liquid, to be used in hydraulic systems of various machines where not only splitting of liquid flow into two and more separate streams is required, but also the amount of liquid supplied to the user should be controlled.

The invention is preferably, but not exclusively, applicable to the lubrication system of a two-stroke carburetor engine in which the control of oil supply should be effected over a broad range under fluctuations of the engine load.

DESCRIPTION OF THE PRIOR ART

Splitters of an initial flow of liquid, comprising a casing having a cylindrical chamber, an inlet passage for admitting liquid to the cylindrical chamber, an axially movable rod accommodated in the cylindrical chamber which rod has a helical groove, and two outlet passages located on one side of the inlet passage for discharging the liquid upon splitting of the initial flow into two separate streams, are widely known in the art.

In the known flow splitters, the helical groove on the periphery of the rod defines, with the walls of the cylindrical chamber, a throttle passage in the casing for the flow of liquid. The inlet passage for admission of liquid flow to the cylindrical chamber and two outlet passages for feeding the liquid to the user and back to the initial flow are arranged in series along the axis of the casing chamber. Thus, the helically grooved rod functions as a throttling member to split the liquid flow into two separate streams in inverse proportion to the length of respective passages and in such manner that a greater fraction of the initial flow is always fed to the outlet passage which is the first one in the flow path, and a smaller fraction of the flow is fed to the second passage downstream. The helically grooved rod is displaced along the axis of the cylindrical chamber by means of an auxiliary screw which is used for correcting the flow splitting between the outlet passages. By displacing the throttling member axially of the chamber, the liquid flow rate is controlled over a sufficiently broad range. This, however, requires a relatively large axial displacement of the throttling member, which is commensurate with its full length, thus resulting in increased size of the flow splitter so that it cannot be used as a metering means, e.g. in pressure lubrication systems of two-stroke carburettor engines of the type used for motorcycles.

In the prior art flow splitters, the amount of liquid fed to a user is varied depending on the amount of axial displacement of the throttling member in accordance with the law determined by an equilateral hyperbola having the branch ends assymptotically approaching coordinate axes. This means that the amount of liquid fed to the user varies but insignificantly at relatively low flow rates, even with large displacements of the throttling member, thus hampering flow rate control in splitters of such type.

SUMMARY OF THE INVENTION

It is an object of the invention to provide a splitter of an initial flow of liquid, so designed as to enable control of liquid supply to the user over a broad range with a relatively small axial displacement of the throttling member and a relatively small size of the flow splitter.

Another object of the invention is to substantially change the amount of liquid fed to the user at relatively low flow rates commensurate with minimum delivery.

Still another object of the invention is to split an initial flow of liquid into a plurality of separate streams so as to concurrently feed the liquid to two and more users.

These and other objects are accomplished in a flow splitter comprising a casing having a cylindrical chamber; an inlet passage for admitting an initial flow of liquid to the cylindrical chamber of the casing; a throttling member in the form of an axially movable rod coaxially arranged within the cylindrical chamber of the casing; a helically grooved portion of the peripheral surface of the rod defining with the chamber walls, a throttle passage in the casing for the flow of liquid which is fed to the peripheral surface of the rod directly at the helically grooved portion thereof and spread along the throttle passage in opposite directions from the inlet passage to be split into separate streams; at least two outlet passages for discharging the liquid from the cylindrical chamber of the casing after splitting of the starting flow, one of the passages being intended for feeding one of the separate streams back to the initial flow, and the other passages being used to feed the separate streams to users. The outlet passages for feeding the liquid to users are arranged at a substantially equal distance from the inlet passage and on a different side thereof relative to the outlet passage for feeding the separated stream of liquid back to the initial flow, the distance between the geometrical axes of the inlet passage and outlet passages for feeding separate streams of liquid to users being substantially equal to the length of the helically grooved portion of the rod, that is to the length of the throttling portion of the rod.

BRIEF DESCRIPTION OF THE DRAWINGS

The invention will now be described with reference to specific embodiments thereof, illustrated in the accompanying drawings, in which.

DETAILED DESCRIPTION OF THE INVENTION

Figure 1:
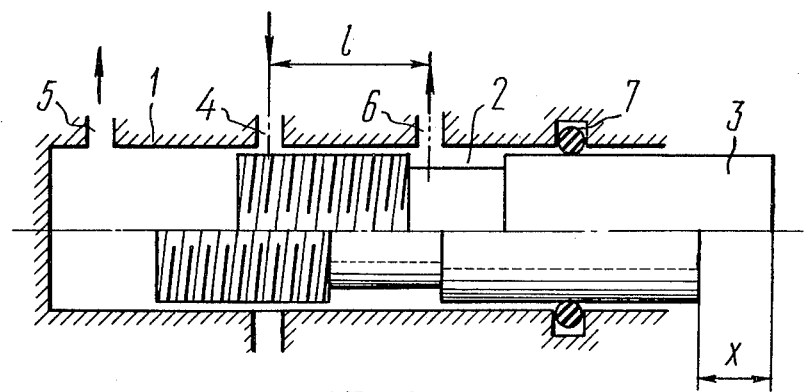
FIG. 1 diagrammatically shows a liquid flow splitter according to the invention.

The liquid flow splitter comprises a casing 1 (FIG. 1) having a cylindrical chamber 2 in which there is coaxially arranged an axially movable throttling member 10 in the form of a rod 3 having a smooth cylindrical peripheral surface and a helically grooved or throttling portion 12.

A reduced diameter portion 14 in rod 3 joins rod 3 and helically grooved portion 12 to provide a flow passage 16 in cylindrical chamber 2.

Throttling member 10 is axially slideable by external means (not shown) a distance x along cylindrical chamber 2 between its two extreme positions shown.

The helically grooved portion 12 of the throttling member 10 defines with the wall of the chamber 2 a throttle passage for the flow of liquid.

The casing 1 has an inlet passage 4 for admitting an initial flow of liquid to the chamber 2 where it directly impinges on the peripheral surface of the helically grooved portion 12. An outlet passage 5 is provided for feeding one of the separated streams of the liquid from cylindrical chamber 2 back to the initial flow. An outlet passage 6 is provided for feeding another separated liquid stream from cylindrical chamber 2 to a user. According to the invention, the passages 5 and 6 are located on opposite sides of the inlet passage 4, the outlet passage 6 being located at a distance "l" from the inlet passage 4 which is substantially equal to the length of the helically grooved portion of the rod 3 to which the initial flow of liquid is directly fed from the inlet passage 4.

Rod 3 is sealed in the casing 1 by means of a packing 7 and extends outside the casing 1 for connection to a drive means (not shown) for imparting axial displacement to the rod.

OPERATION OF THE LIQUID FLOW SPLITTER

A starting flow of liquid is fed, via the inlet passage 4, to the peripheral surface of the helically grooved portion 12. Liquid is spread in opposite directions along the throttle passage defined by the helical groove in helically grooved portion 12 and walls of the chamber 2 from the inlet passage 4 whereby the flow is split into separate streams in a ratio depending on the lengths of the helical throttle passages which represent hydraulic resistances of the portions of the rod 3 in the flow path to outlet passage 6 and the user and to outlet passage 5 which feeds the liquid back to the starting flow. The separated streams of liquid obtained after splitting of the starting flow are discharged from the chamber 2 via the passages 5 and 6.

Figure 2:
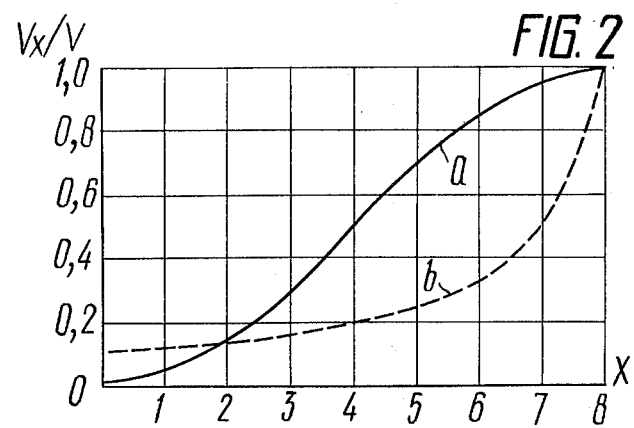
FIG. 2 shows the amount of liquid fed to the user versus the amount of axial displacement of the rod having a throttling portion.

FIG. 2 is a graphical presentation of the relationship between the supply of a separated stream of liquid to a user in terms of a fraction $V_x/V$ wherein $V_x$ is the volume of the separated stream of liquid fed to a user via the passage 6 of the flow splitter, and V is the volume of the initial flow of liquid admitted to the flow splitter via the passage 4.

By displacing the rod 3 axially along the cylindrical chamber 2, the amount "x" (FIGS. 1 and 2) of displacement required for feeding to a user a pre-set volume $V_x$ of liquid separated from the total volume V thereof fed with the initial flow of liquid to the chamber 2, may be set up. Due to the effect of the above-mentioned hydraulic resistances during splitting of the initial flow of liquid the fraction $V_x/V$ of the liquid flow fed to a user may be varied over a broad range with a relatively small axial displacement of the rod 3 having the throttling portion.

FIG. 2 shows fraction x/V of the flow of the liquid fed to the user versus the amount "x" of displacement of the rod 3 for the flow splitter according to the invention (curve "a") and for a conventional flow splitter (curve "b"). The data for the flow splitter according to the invention having a helically grooved portion having a diameter of 5 mm and a length of 12.5 mm, and for a conventional flow splitter having a throttling portion of the same dimensions, have been obtained by calculation.

In this specific embodiment, the flow splitter is used in the lubrication system of two-stroke carburettor engines. It has been found, by way of experiments, that axial displacement of the throttling member by 5–6 mm enables control of oil flow rate from the lower limit of 0.01–0.005 to the upper limit of 0.05–0.04 of the fuel delivery rate. With an appropriate selection of a pump for feeding liquid to the inlet passage 4 of the flow splitter, the flow-splitter of one type may be used as an oil meter in lubrication systems of two-stroke carburettor engines having a piston displacement volume from 50 to 500 $cm^3$.

Figure 3:
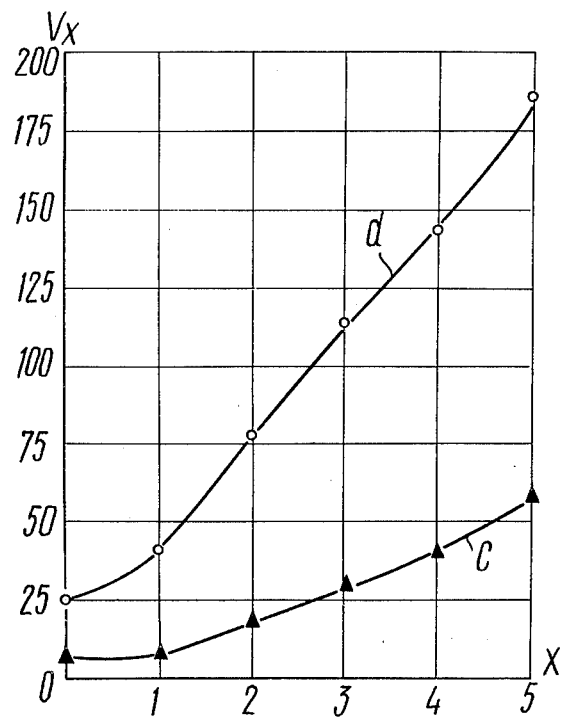
FIG. 3 shows oil supply in the lubrication system of a two-stroke carburettor engine versus the axial displacement of the rod having a throttling portion, for motorcycle engines of two different classes.

FIG. 3 shows graphically the relationship between oil supply in 175 $cm^3$ (curve "c") and 350 $cm^3$ (curve "d") engines and the axial displacement "x" of the rod 3. The data for plotting the curves were obtained with one and the same flow splitter whose helically grooved portion had a diameter of 5 mm in a length of 12.5 mm, with an engine shaft speed of 2,000 rpm.

If necessary, the helical grooving of the helically grooved portion 12 may be made multiple. In this case, the initial flow of liquid is split into a plurality of independent streams, and the flow splitter may have independent outlets to users at each thread of the grooved portion.

Figures 4, 5:
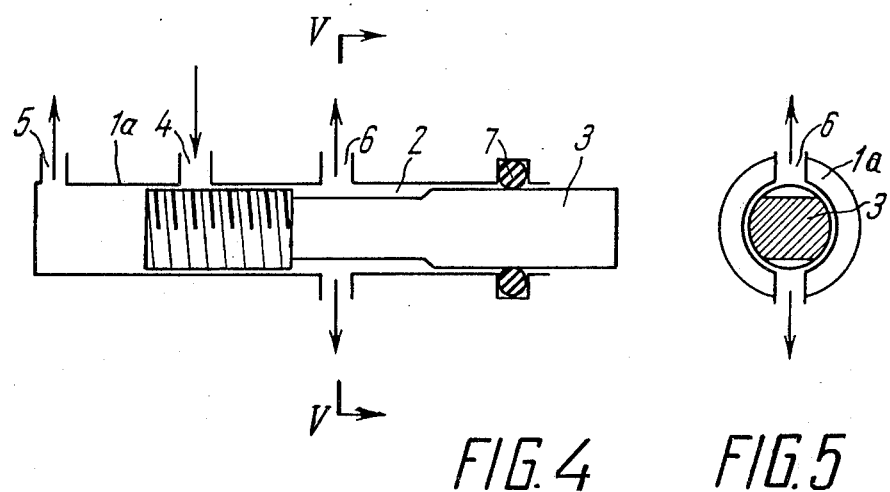
FIG. 4 diagrammatically shows a liquid flow splitter having two outlet passages for liquid supply to two users, according to the invention.
FIG. 5 is a sectional view taken along line V—V in FIG. 4.

FIGS. 4 and 5 show the flow splitter in which the axially movable throttling member 10' has a helically grooved portion 12' which includes two equal interlaced spiral grooves 18 and 18'. As is well known, interlaced spiral grooves may be arranged to terminate at different circumferential positions. The casing 1a has two outlet passages 6 and 6' spaced about the circumference of casing 10 for feeding separated streams of liquid to users. Outlet passages 6 and 6' are located at substantially equal distances from the inlet passage 4.

Rod 3 includes two flattened portions 20 and 20' adjacent outlet passages 6 and 6' respectively to form flow passages 22 and 22'. As is most clearly seen in FIG. 5, the portion of rod 3 between flattened portions 20 and 20' has a diameter which closely fits cylindrical chamber 2 and thus substantially isolates fluid in flow passages 22 and 22' from each other. As is most clearly seen in FIG. 4, spiral groove 18 opens into flow passage 22 and spiral groove 18' opens into flow passage 22'. Thus, two substantially independent flows are obtained through outlet passages 6 and 6'.

Spiral grooves 18 and 18' both open into a flow channel 24 which feed outlet passage 5.

What is claimed is:

1. A liquid flow splitter for splitting an initial flow of liquid into at least three essentially isolated streams of liquid comprising:
   a casing;
   a cylindrical chamber in said casing, said cylindrical chamber having a substantially smooth cylindrical inner peripheral surface;
   a throttling member slideably fitted within said casing;
   said throttling member including a cylindrical portion abutting said inner peripheral surface;
   first and second continuous interlaced helical grooves on an outer cylindrical peripheral surface of said cylindrical portion, said first and second continuous interlaced helical grooves extending from one end of said cylindrical portion to a second end thereof;

means for permitting linear movement of said cylindrical portion without rotation between first and second axial positions in said cylindrical chamber;

an inlet passage adapted for the passage of an initial flow of liquid into said cylindrical chamber;

said inlet passage being positioned to impinge said initial flow of liquid directly on said first and second continuous helical grooves at all axial positions of said cylindrical portion between said first and second positions whereby liquid impinging on said helical grooves is split to flow in opposite directions between said helical grooves and said cylindrical inner peripheral surface until said liquid exits said first and second continuous helical grooves at first and second opposed ends thereof;

a first outlet passage spaced axially a first distance in a first direction along said cylindrical chamber from the said inlet passage, said first distance exceeding a maximum position of said cylindrical portion in said first direction;

second and third outlet passages spaced axially from said inlet passage a second distance in a second direction opposite to said first direction along said cylindrical chamber, said second distance exceeding a maximum position of said cylindrical portion in said second direction;

said second and third outlet passages being circumferentially spaced about said cylindrical chamber;

a first flow passage from an end of said first helical groove at said second end of said cylindrical portion to said second outlet passage;

a second flow passage from an end of said second helical groove at said second end of said cylindrical portion to said third outlet passage;

means for substantially isolating flow of liquid between said first and second flow passages;

said first outlet passage being adapted for feeding back liquid therefrom to rejoin said initial flow of liquid; and said second and third outlet passages being adapted for feeding liquid therefrom to first and second users respectively.

* * * * *